Sept. 30, 1969   H. E. RIORDAN ET AL   3,469,456
DIGITAL FLUID ACCELEROMETER
Filed Dec. 9, 1966

INVENTOR.
HUGH E. RIORDAN
ROBERT J. GANTHER
BY
Constantine A. Michalos
ATTORNEY

United States Patent Office 3,469,456
Patented Sept. 30, 1969

---

3,469,456
DIGITAL FLUID ACCELEROMETER
Hugh E. Riordan, Wyckoff, and Robert Joseph Ganther, Kinnelon, N.J., assignors to Singer-General Precision, Inc., a corporation of Delaware
Filed Dec. 9, 1966, Ser. No. 600,417
Int. Cl. G01p *15/00;* G06m *1/12*
U.S. Cl. 73—515                                      6 Claims

ABSTRACT OF THE DISCLOSURE

A proof mass is suspended so that its displacement along an axis differentially varies the volume of a pair of chambers having fluid inlets and restricted outlets. The damping of the proof mass and dimensions of the parts are so chosen that the proof mass oscillates when there is no acceleration, and in the presence of acceleration at a frequency that is a function of the acceleration. The pressures in the chambers may be sensed as an output.

---

This invention relates to an inertial instrument and more particularly to a fluid accelerometer which performs digital output signals as a function of acceleration.

In the present invention there is provided a fluid accelerometer having a pair of opposed hydrostatic fluid bearings for suspending a proof mass within a housing which is utilized as a means for containing the proof mass and for receiving and directing fluid outwardly from each end of an elongated chamber depending on the direction of acceleration. The fluid ejected being subjected to pressure drops within varying volume chambers formed through the movement of the proof mass within said housing. The primary force acting upon the proof mass being the acceleration along its sensitive axis which is in line with the center longitudinal axis of the housing. The equilibrium condition which would exist by subjecting fluid within the housing will change under the effect of acceleration and the center of oscillation will shift varying the volumes of the chambers. Therefore, by proper selection of the end areas of the proof mass and the pressures within the chambers formed between the proof mass and the housing variable volume chambers will be formed with variable resisting pressures whereby the proof mass can be made to oscillate at frequency which is a function of the acceleration producing a digital output.

Therefore, an object of this invention is to provide a means for obtaining a digital output as a function of acceleration.

Another object of this invention is to provide accelerometer means for sensing the acceleration and for applying this acceleration to variable areas producing thereby digital outputs as function of the acceleration.

A further object of this invention is to provide a digital output as a function of acceleration by utilizing a proof mass which is suspended in a housing on a pair of opposed hydrostatic fluid bearings and which is movable along a longitudinal center axis of the housing in such a way as to allow translation along this axis in the direction of acceleration, and wherein the proof mass and the housing have the same longitudinal axis on which is located a pair of opposed outlets for directing fluid received in said housing in opposed discharge relation and at an amount depending on the location of the proof mass relative to the housing which in turn is dependent to the acceleration.

Other objects and many additional advantages will be more readily understood by those skilled in the art after a detailed consideration of the following specification taken with the accompanying drawings wherein.

Figure 1:
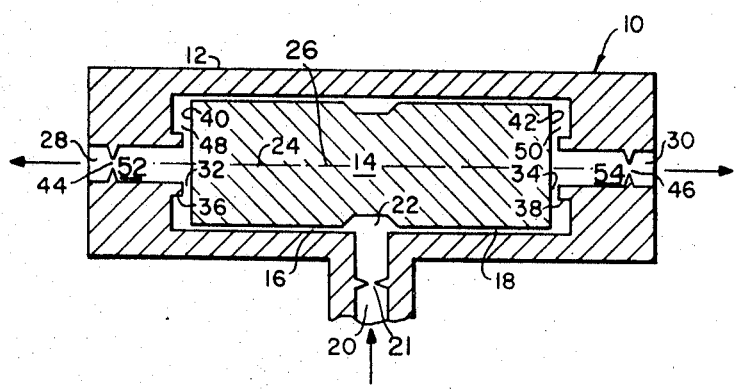
FIG. 1 is a side sectional view showing the overall arrangement of the digital fluid accelerometer in accordance with a preferred embodiment of the present invention.

Referring now to FIGURE 1 of the drawing an accelerometer 10 includes a fluid filled cylindrical housing 12 supporting a proof mass 14 suspended by means of hydrostatic fluid bearings 16 and 18 receiving fluid through a fluid inlet 20 located midway of the housing 12, and which fluid is forced directed through a nozzle 21 and an annulus 22 before being directed through the bearings 16 and 18. The proof mass 14 is suspended by means of the hydrostatic fluid bearings 16 and 18 in such a way as to allow translation along an axis which is substantially axially aligned along a longitudinal central axis 26 of the housing 12 and a longitudinal central axis 26 of the proof mass 14.

The fluid which can be either liquid or gas is made to pass through the fluid inlet 20, the nozzle 21, and through the housing 12 from the inlet 20 to axially aligned outlets 28 and 30 outwardly of the longitudinal central axis 24 of the housing 12. The fluid received from the inlet 20 of the housing 12 is discharged from either the right or left outlet 28 and 30 or through both outlets depending upon the position of the proof mass 14 within the housing 12. In being directed through the housing 12, the fluid is subjected to pressure drops in the areas of the nozzle 21, the bearings 16 and 18, and through variable sized openings 32 and 34 being formed by protrusions 36 and 38 of the housing 12 and effective end areas 40 and 42 of the proof mass 14 respectively. Further the fluid is subjected to a pressure drop across nozzles 44 and 46 formed within the outlets 28 and 30 respectively. As noted the pressure drops at openings 32 and 34 are a function of the position of the proof mass 14 in relation to the housing 12. The protrusions 36 and 38, the internal end areas of the housing 12 and the effective end areas 40 and 42 of the proof mass 14 form variable volume chambers 48, 50, 52 and 54. Due to acceleration forces the chambers 48, 50, 52 and 54 vary in volume as the proof mass 14 moves longitudinally along the axis 24 of the housing 12.

As can be seen from FIGURE 1 therefore, the pressure drops at openings 32 and 34 and the pressures in the chambers 48, 50, 52 and 54 are a function of the position of the proof mass 14.

As brought out before, the primary forces acting upon the proof mass 14 are the acceleration forces along the sensitive axis of the proof mass, in this case the axis 24 and 26, the pressure forces produced within chambers 48, 50, 52 and 54 at one end of the proof mass 14. More specifically the forces produced by the pressures within the chambers 48, 50, 52 and 54, and the effective areas 40 and 42 of the proof mass 14, forming these chambers and upon which the pressures act, produce the forces herein outlined. The force of acceleration and the forces produced by the pressures within the chambers 48, 50, 52 and 54 acting against the effective areas of the proof mass 14 react to produce oscillation of the proof mass 14 as hereinafter more fully described.

It can be seen that under zero acceleration and when the pressures within fluid bearing 16 is equal to the pressure of fluid bearing 18, the fluid flow through the opening 32 is equal to the fluid flow through the opening 34 and the fluid flow through the nozzle 44 is equal to the fluid flow through the nozzle 46. The flow through this device will therefore be equally divided between the right outlet 28 and the left outlet 30, as viewed in FIGURE 1. If the proof mass 14 moves in either direction this equilibrium condition will be upset in that the fluid flow through the opening 32 and the fluid flow through the opening 34 will change. For example, if the proof mass 14 is displaced to the right, as viewed in FIGURE 1, the fluid flow through the opening 34 will decrease while the fluid flow through the opening 32 will increase. As a result, the pressure within the chamber 50 will increase and the pressure within chamber 48 will decrease. Furthermore the pressure in the chamber 54 will decrease, since momentarily the fluid flow through opening 46 will remain constant while less fluid will flow into the chamber 54 through the opening 34 and the pressure within chamber 52 will increase. The pressure in the chamber 52 will increase, since momentarily the fluid flow through the opening 44 will remain constant while more fluid will flow into the chamber 52 through the opening 32. It can be seen therefore, if the effective end area of the proof mass 14 within chamber 50, which is the same as the effective end area of the proof mass 14 within chamber 48, is greater than the effective end area of the proof mass 14 within chamber 54, which is equal to the effective end area of the proof mass 14 within area 52, there will exist a force tending to return the proof mass 14 to its center position. Therefore, under stable conditions, a displacement of the proof mass 14 due to acceleration is opposed by a force which is a function of the pressures within chambers 48 and the pressures within chamber 50. Since the pressures in chambers 48 and 50 are, in turn, functions of the displacement of proof mass 14, this opposing force may be considered to be similar to the so-called "spring" force in a vibrating mass-spring system which latter is oscillating at its natural frequency.

It is well known from a study of such vibrating systems that in the absence of sufficient damping the device is unstable and the proof mass 14 will tend to oscillate. Therefore, when no external force, such as that due to the effect of acceleration, on the proof mass 14 is present and with little or no damping in the system the proof mass 14 will tend to oscillate about the center position at a frequency which is a function primarily of the pressures within chambers 48 and 50, the pressures on the effective areas of the proof mass 14 within chambers 48, 50, 52 and 54, the volumes of chambers 48, 50, 52 and 54, and furthermore the resistance to the flow in nozzle 21 and within bearings 16 and 18, through openings 32 and 34 and through nozzles 44 and 46.

Under the effect of acceleration the center of oscillation will shift varying the volume of chambers 48, 50, 52 and 54 which in turn will vary the frequency of oscillation of proof mass 14. Therefore, by proper selection of the pressures, the resistance and the volumes of the chambers 48, 50, 52 and 54, the proof mass 14 can be made to oscillate at a frequency which is a function of the acceleration. By sensing either pressures in chambers 48 and 50 and/or the pressures in chambers 52 and 54 or by sensing motion and/or position of the proof mass 14 with respect to the housing 12, a digital output representing the frequency of oscillation of proof mass 14 and therefore the acceleration of the proof mass can be obtained at the fluid outlets 28 and 30.

Figure 2:
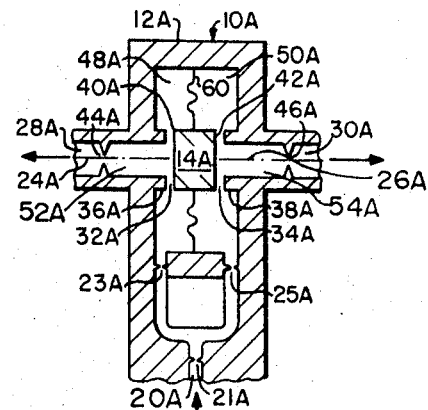
FIG. 2 is a side sectional view showing another embodiment of the invention of FIGURE 1.

Referring to FIGURE 2 of the drawings, inasmuch as accelerometer 10A shown in FIGURE 2 with some variations is substantially identical to the accelerometer 10 shown in FIGURE 1, duplicate numbers with the reference letter A would be applied to the corresponding elements of the accelerometer 10A shown in FIGURE 2. In addition, it can be shown that the functions of the accelerometer 10A of FIGURE 2 are in the same manner as the accelerometer 10 of FIGURE 1 except that in place of the hydrostatic bearings 16 and 18 there is placed a diaphragm 60. Furthermore, the effective end areas of the proof mass 14 in the chambers 48 and 50 of the accelerometer 10 of FIGURE 1 are the combined effective areas of the diaphragm 60 and the proof mass 14A.

Referring now to FIGURE 2 of the drawing an accelerometer 10A includes a fluid filled cylindrical housing 12A supporting a proof mass 14A suspended by means of the diaphragm 60. The housing 12A receives fluid through a fluid inlet 20A and which fluid is forced directed through nozzles 23A and 25A to either side of the diaphragm 60. The proof mass 14A is suspended by means of the diaphragm 60 in such a way as to allow translation along an axis which is substantially axially aligned along a longitudinal central axis 24A of the housing 12A and a longitudinal central axis 26A of the proof mass 14A.

The fluid which can be either liquid or gas is made to pass through the fluid inlet 20A the nozzles 23A and 25A and through the housing 12A from the inlet 20A to axially aligned outlets 28A and 30A outwardly of the longitudinal central axis 24A of the housing 12A. The fluid received from the inlet 20A of the housing 12A is discharged from either the right or left outlet 28A and 30A or through both outlets depending upon the position of the proof mass 14A within the housing 12A. In being directed through the housing 12A, the fluid is subjected to pressure drops in the areas of the nozzles 23A and 25A, and through variable sized openings 32A and 34A being formed by protrusions 36A and 38A of the housing 12A and effective end areas 40A and 42A of the proof mass 14A respectively. Further the fluid is subjected to a pressure drop across nozzles 44A and 46A formed within the outlets 28A and 30A respectively. As noted the pressure drops at openings 32A and 34A are a function of the position of the proof mass 14A in relation to the housing 12A. The protrusions 36A and 38A, the internal areas of the housing 12A and the proof mass 14A form variable volume chambers 48A, 50A, 52A and 54A. Due to acceleration forces, the chambers 48A, 50A, 52A and 54A vary in volume as the proof mass 14A moves longitudinally along the axis 24A of the housing 12A.

As can be seen from FIGURE 2 therefore, the pressure drops at openings 32A and 34A and the pressures in the chambers 48A, 50A, 52A and 54A are a function of the position of the proof mass 14A.

As brought out before, the primary forces acting upon the proof mass 14A are the acceleration forces along the sensitive axis of the proof mass, in this case the axis 24A and 26A, the pressure forces produced within chambers 48A, 50A, 52A and 54A at one end of the proof mass 14A. More specifically the forces produced by the pressures within the chambers 48A, 50A, 52A and 54A, and the effective areas 40A and 42A of the proof mass 14A forming these chambers and upon which the pressures act, produce the forces herein outlined. The force of acceleration and the forces produced by the pressures within the chambers 48A, 50A, 52A and 54A acting against the effective areas of the proof mass 14A react to produce oscillation of the proof mass 14A as hereinafter more fully described.

It can be seen that under zero acceleration and when the fluid flow through th opening 32A is equal to the fluid flow through the opening 34A and the fluid flow through the nozzle 44A is equal to the fluid flow through the nozzle 46A. The flow through this device will be equally divided between the right outlet 28A and the left outlet 30A, as viewed in FIGURE 2. If the proof mass 14A moves in either direction this equilibrium condition will be upset in that the fluid flow through the opening 32A and the fluid flow through the opening 34A will change. For example, if the proof mass 14A is displaced to the right, as viewed in FIGURE 2, the fluid flow through the opening 34A will decrease while the fluid flow through the opening 32A will increase. As a result, the pressure within the chamber 50A will increase and the pressure within chamber 48A will decrease. Furthermore the pressure in the chamber 54A will decrease, since momentarily the fluid flow through opening 46A will remain constant while less fluid will flow into the chamber 54A through the opening 34A, and the pressure within chamber 52A will increase. The pressure in the chamber 52A will increase, since momentarily the fluid flow through the opening 44A will remain constant while more fluid will flow into the chamber 52A through the opening 32A. It can be seen therefore, if the effective end area of the proof mass 14A within chamber 50A, which is the same as the effective end area of the proof mass 14A within chamber 48A, is greater than the effective end area of the proof mass 14A within chamber 54A which is equal to the effective end area of the proof mass 14A within area 52A, there will exist a force tending to return the proof mass 14A to its center position. Therefore, under stable conditions, a displacement of the proof mass 14A due to acceleration is opposed by a force which is a function of the pressures within chambers 48A and the pressures within chamber 50A.

In the absence of sufficient damping, the device is unstable and the proof mass 14A will oscillate. Therefore, when no external force, such as that due to the effect of acceleration, on the proof mass 14A is present, the proof mass 14A will oscillate about the center position at a frequency which is a function primarily of the pressures within chambers 48A and 50A, the pressures on the effective areas of the proof mass 14A within chambers 52A and 54A, the volumes of chambers 48A, 50A, 52A and 54A, and furthermore the resistance to the flow in nozzles 23A and 25A, through openings 32A and 34A and through nozzles 44A and 46A.

Under the effect of acceleration, the center of oscillation will shift varying the volume of chambers 48A, 50A, 52A and 54A, which in turn will vary the frequency. Therefore, by proper selection of the pressures, the resistance and the volumes of the chambers 48A, 50A, 52A, and 54A, the proof mass 14A can be made to oscillate at a frequency which is a function of the acceleration. By sensing either pressures in chambers 48A and 50A and/or the pressures in chambers 52A and 54A or by sensing motion and/or position of the proof mass 14A with respect to the housing 12A, a digital output can be obtained at the fluid outlets 28A and 30A.

Figure 3:
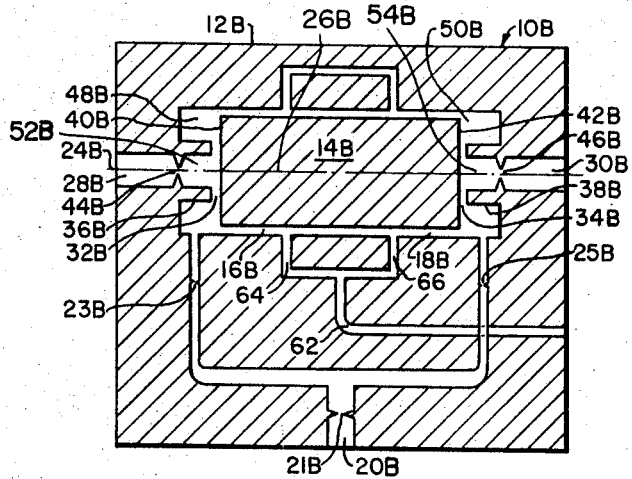
FIG. 3 is a side sectional view showing still another embodiment of this invention.

Referring to FIGURE 3 of the drawing, and inasmuch as accelerometer 10B shown in FIGURE 3 with some variations is substantially identical to the accelerometers 10 and 10A shown in FIGURES 1 and 2, respectively, duplicate numbers with the reference letter B would be applied to the corresponding elements of the accelerometer 10B shown in FIGURE 3. In addition, it can be shown that the functions of the accelerometer 10B of FIGURE 3 are in the same manner as the accelerometers 10 and 10A of FIGURES 1 and 2 except that in place of the diaphragm 60 of the accelerometer 10A of FIGURE 2, hydrostatic bearings 16B and 18B are used as in the case of the accelerometer 10 of FIGURE 1.

Referring now to FIGURE 3 of the drawing, an accelerometer 10B includes a fluid filled cylindrical housing 12B supporting a proof mass 14B suspended by means of hydrostatic fluid bearings 16B and 18B. The bearings 16B and 18B receive a fluid supply through an inlet 62 and a pair of lines 64 and 66 respectively. The housing 12B receives fluid through a fluid inlet 20B, which fluids is force directed through a nozzle 21B and nozzles 23B and 25B before being directed through chambers 48B and 50B. The proof mass 14B is suspended by means of the hydrostatic fluid bearings 16B and 18B in such a way as to allow translation along an axis which is substantially axially aligned along a longitudinal central axis 24B of the housing 12B and a longitudinal central axis 26B of the proof mass 14B.

The fluid which can be either liquid or gas is made to pass through the fluid inlet 20B, the nozzles 21B, 23B and 25B directly to chambers 48B and 50B of the housing 12B from the inlet 20B to axially aligned outlets 28B and 30B outwardly of the longitudinal central axis 24B of the housing 12B. The fluid received from the inlet 20B of the housing 12B is discharged from either the right or left outlet 28B and 30B or through both outlets depending upon the position of the proof mass 14B within the housing 12B. In being directed through the housing 12B, the fluid is subjected to pressure drops in the areas of the nozzle 21B the nozzles 23B and 25B, and through variable sized openings 32B and 34B being formed by protrusions 36B and 38B of the housing 12B and effective end areas 40B and 42B of the proof mass 14B respectively. Further, the fluid is subjected to a pressure drop across nozzles 44B and 46B formed within the outlets 28B and 30B respectively. As noted, the pressure drops at openings 32B and 34B are a function of the position of the proof mass 14B in relation to the housing 12B. The protrusions 36B and 38B, the internal end areas of the housing 12B and the effective end areas 40B and 42B of the proof mass 14B form variable volume chambers 48B, 50B, 52B and 54B. Due to acceleration forces the chambers 48B, 50B, 52B and 54B vary in volume as the proof mass 14B moves longitudinally along the axis 24B of the housing 12B.

As can be seen from FIGURE 3 therefore, the pressure drops at openings 32B and 34B and the pressures in the chambers 48B, 50B, 52B and 54B are a function of the position of the proof mass 14B.

As brought out before the primary forces acting upon the proof mass 14B are the acceleration forces along the sensitive axis of the proof mass, in this case the axis 24B and 26B the pressure forces produced within chambers 48B, 50B, 52B and 54B at one end of the proof mass 14B. More specifically the forces produced by the pressures within the chambers 48B, 50B, 52B and 54B and the effective areas 40B and 42B of the proof mass 14B, forming these chambers and upon which the pressures act produce the forces herein outlined. The force of acceleration and the forces produced by the pressures within the chambers 48B, 50B, 52B and 54B acting against the effective areas of the proof mass 14B react to produce oscillation of the proof mass 14B as hereinafter more fully described.

It can be seen that under zero acceleration and when the pressures within fluid bearing 16B equal to the pressure of bearing 18B, the pressure in the opening 32B is equal to the pressure in the opening 34B and the pressure within the nozzle 44B is equal to the pressure within the nozzle 46B, the flow through this device will be equally divided between the right outlet 28B and the left outlet 30B, as viewed in FIGURE 3. If the proof mass 14B moves in either direction this equilibrium condition will be upset in that the fluid flow through the opening 32B and the fluid flow through the opening 34B will change. For example, if the proof mass 14B is displaced to the right, as viewed in FIGURE 3, the fluid flow through the opening 34B will decrease while the fluid flow through the opening 32B will increase. As a result, the pressure within the chamber 50B will increase and the pressure within chamber 48B will decrease. Furthermore the pressure in the chamber 54B will decrease, since momentarily the fluid flow through opening 46B will remain constant while less fluid will flow into the chamber 54B, through the opening 34B, and the pressure within chamber 52B will increase. The pressure in the chamber 52B will increase, since momentarily the fluid flow through the opening 44B will remain constant while more fluid will flow into the chamber 52B, through the opening 32B. It can be seen therefore, if the effective end area of the proof mass 14B within chamber 50B, which is the same as the effective end area of the proof mass 14B within chamber 48B, is greater than the effective end area of the proof mass 14B within chamber 54B which is equal to the effective end area of the proof mass 14B within area 52B, there will exist a force tending to return the proof mass 14B to its center position. Therefore, under stable conditions, a displacement of the proof mass 14B due to acceleration is opposed by a force which is a function of the pressures within chambers 48B and the pressures within chamber 50B.

In the absence of sufficient damping, the device is unstable and the proof mass 14B will oscillate. Therefore, when no external force, such as that due to the effect of acceleration, on the proof mass 14B is present, the proof mass 14B will oscillate about the center position at a frequency which is a function primarily of the pressures within chamber 48B and 50B, the pressures on the effective areas of the proof mass 14B within chambers 48B, 50B, 52B and 54B, the volumes of chambers 48B, 50B, 52B and 54B, and furthermore the resistance to the flow in nozzles 23B and 25B and through openings 32B and 34B and through nozzles 44B and 46B.

Under the effect of acceleration, the center of oscillation will shift varying the volume of chambers 48B, 50B, 52B and 54B, which in turn will vary the frequency. Therefore, by proper selection of the pressures, the resistance and the volumes of the chambers 48B, 50B, 52B and 54B, the proof mass 14B can be made to oscillate at a frequency which is a function of the acceleration. By sensing either pressures in chambers 48B and 50B and/or the pressures in chambers 52B, 54B or by sensing motion and/or position of the proof mass 14B with respect to the housing 12B, a digital output can be obtained at the fluid outlets 28B and 30B.

While the present invention has been described in preferred embodiments, it will be obvious to those skilled in the art that various modifications can be made therein within the scope of the invention, and it is intended that the appended claims cover all such modifications.

What is claimed is:

1. A digital fluid accelerometer comprising a housing, a proof mass within said housing operably responsive to input acceleration for movement substantially along a longitudinal axis of said housing, fluid inlet means for supplying fluid within said housing, a pair of fluid outlets extending substantially along said axis and being disposed at respective axial ends of said housing, each of said outlets having a restrictive nozzle opening communicating therewith for limiting the flow of fluid therefrom, a pair of chambers disposed within said housing adjacent to and communicating with each of said restrictive openings respectively and connected to said inlet means, portions of the proof mass normal to said axis forming a part of the wall of each chamber, said proof mass being sufficiently undamped so that when said fluid passes from said inlet through said chambers, restrictive nozzle openings and out through said outlets said proof mass is normally maintained in an oscillating condition about a null-centered reference position within said housing, the frequency of oscillation being dependent upon the volumes of said chambers and the pressure drops across said inlet, said restrictive openings and said outlets wherein the application of an acceleration along said axis is effective to vary said chamber volumes and said pressure drops across said restrictive openings to cause the frequency of oscillation of said proof mass to vary whereby the magnitude of said acceleration may be sensed by measuring the pressures in said chambers to produce a digital output representative thereof.

2. The structure of claim 1, wherein said pair of chambers comprise an enclosure formed at each end of said housing between said proof mass and said housing respectively, and wherein each said fluid outlet includes inwardly directed projections extending towards the location of said mass centrally of said enclosure and aligned with the axis of said chambers producing variable sized openings for presenting a pressure gradient upon the movement of said proof mass relative to said housing due to acceleration.

3. The structure of claim 1 further comprising a diaphragm for supporting said proof mass centrally of said housing at said null position upon equal pressure being received at each end of the housing through said fluid inlet means, said diaphragm further defining said pair of chambers which latter are effected by the movement of said proof mass relative to said housing for producing pressure forces for counteracting the applied acceleration force.

4. The structure of claim 3 wherein said diaphragm supports said proof mass substantially centrally of said housing thereby providing equal chambers on each side of said diaphragm within said housing and said fluid inlet includes a nozzle and each of said fluid outlets includes a nozzle for metering fluid within said chambers respectively upon movement of said proof mass due to said applied acceleration.

5. The structure of claim 1 wherein the outside diameter of said proof mass is slightly smaller than the inside diameter of said housing and said fluid is effective to form gas bearings interposed therebetween for supporting said proof mass within said housing and for allowing translation of said proof mass along said axis latter which is substantially axially aligned along a longitudinal central axis of said proof mass.

6. The structure of claim 5 further comprising an independent fluid inlet opening for supplying fluid for said gas bearings.

References Cited

UNITED STATES PATENTS

| | | | |
|---|---|---|---|
| 3,014,373 | 12/1961 | Lindbom | 73—515 |
| 3,221,562 | 12/1965 | Borcher et al. | 73—515 |
| 3,315,531 | 4/1967 | Grimland | 73—515 |

JAMES J. GILL, Primary Examiner

U.S. Cl. X.R.

235—201